United States Patent
Sayag

(10) Patent No.: US 8,556,420 B2
(45) Date of Patent: Oct. 15, 2013

(54) METHOD AND SYSTEM FOR THE ON-LINE SELECTION OF A VIRTUAL EYEGLASS FRAME

(75) Inventor: Jean-Philippe Sayag, Paris (FR)

(73) Assignee: ACEP France, Paris (FR)

( * ) Notice: Subject to any disclaimer, the term of this patent is extended or adjusted under 35 U.S.C. 154(b) by 554 days.

(21) Appl. No.: 12/777,515

(22) Filed: May 11, 2010

(65) Prior Publication Data

US 2010/0283844 A1  Nov. 11, 2010

(30) Foreign Application Priority Data

May 11, 2009  (FR) .................................. 09 02254

(51) Int. Cl.
  *A61B 3/10* (2006.01)
  *A61B 3/00* (2006.01)
(52) U.S. Cl.
  USPC .......................................... 351/204; 351/246
(58) Field of Classification Search
  USPC ....................... 351/204, 246; 33/200; 356/124
  See application file for complete search history.

(56) References Cited

U.S. PATENT DOCUMENTS

2009/0021693 A1* 1/2009 Sessner et al. ............... 351/204

* cited by examiner

*Primary Examiner* — Mahidere Sahle
(74) *Attorney, Agent, or Firm* — Bachman & LaPointe, P.C.

(57) ABSTRACT

A method for the on-line selection of virtual eyeglass frames, of the type in which the virtual frame is an image designed to be superimposed on a first image of a face, is provided wherein the images being recorded at the same scale as each other in order to be displayed simultaneously in such a way as to produce a representation of the face wearing the virtual frame. The method includes the steps of a second image of the face wearing a reference frame is recorded, the second image displayed at the scale is processed to determine a datum giving the vertical position of the reference frame on the face, and the image of the virtual frame is superimposed on the first image of the face using the datum, so that the relative vertical positions of the virtual frame and the face on the one hand, and of the reference frame and the face on the other, correspond exactly.

14 Claims, 1 Drawing Sheet

METHOD AND SYSTEM FOR THE ON-LINE SELECTION OF A VIRTUAL EYEGLASS FRAME

BACKGROUND (1) Field of the Invention

The present invention relates to a method and system for the on-line selection of a virtual eyeglass frame.

(2) Prior Art

Known systems already allow a user to choose a pair of glasses and, in particular, frames for glasses, using so-called on-line services in the form of for example client-server applications accessible over a communication network such as the Internet.

These on-line services offer an integrated simulation environment in which the person can try on in a virtual fashion a number of different eyeglass frames on a demonstration face or on his or her own face in a virtual representation, for example on a computer screen on which the application is running.

Some of these services also enable the price of the pair of glasses to be simulated from a virtual frame selected by this process, by allowing the patient to input the correction parameters for the choice of corrective lenses adapted to his or her vision.

However, these on-line services are primarily offered to the patient as a guide, to help the patient through the process of selecting eyeglasses, essentially on the basis of esthetics and price, but they do not save him the trouble of then coming out physically to an optician to confirm the choice of frame and determine his or her ophthalmic parameters, which will make it possible to make up his or her corrective lenses adapted to the selected frame.

The reason for this is that, in order to ensure the maximum comfort of the patient when wearing the frame fitted with these corrective lenses, it is important, among other things, that the optical centers of the eyes coincide exactly with the optical centers of the corresponding corrective lenses. It is therefore essential to know in particular the distance between the pupils of the eyes of the patient and said frame. Determining these ophthalmic parameters of the patient as precisely as possible so that the corrective lenses can be centered relative to the patient's eyes clearly requires that the frame to which the corrective lenses are to be fitted must be precisely adjusted to the patient's face.

The problem is that it is not possible in the simulation environment referred to above to adjust the virtual frame in any precise way to the face of the patient in a virtual representation.

It is for this reason that the virtual selection of an eyeglass frame requiring corrective lenses must inevitably be followed up by confirmation and checking by a professional optician so that the latter can adjust the corresponding physical frame accurately to the patient's face, the object being to take the measurements required to work out the various parameters for adjusting and positioning the corrective lenses in the selected frame, and thus make up corrective lenses adapted to the patient and to the selected frame.

At present, although they can make it possible for a patient to remotely select an eyeglass frame on essentially esthetic criteria, the aforementioned on-line services do not therefore allow this selection to be validated and an order to be placed directly remotely for a pair of eyeglasses comprising the selected frame in which the corrective lenses adapted to the patient are fitted. The problem with doing this is basically the fact that the positioning, particularly in the vertical direction, of the selected vertical frame on the vertical representation of the face is highly uncertain, thus preventing the accurate determination of the patient's ophthalmic parameters which are needed in order to make up his or her corrective lenses adapted to the morphology of his or her face and to the selected frame.

SUMMARY OF THE INVENTION

Consequently, a problem that arises, which the present invention aims to solve, is to provide a method for the on-line selection of a virtual frame in which in particular the selected virtual frame can be adjusted accurately to a face in a virtual representation.

With the object of solving this problem, the present invention provides a method for the on-line selection of a virtual eyeglass frame from among a plurality of virtual frames, of the type in which the virtual frame is an image designed to be superimposed on a first image of a face, said images being recorded at the same scale as each other in order to be displayed simultaneously on a screen in such a way as to produce a representation of said face wearing the virtual frame, said method being characterized in that a second image of said face wearing a reference frame is recorded at said scale, said second image displayed at said scale is processed to determine a datum giving the vertical position of said reference frame on said face, and in that said image of the virtual frame is superimposed on said first image of said face using said datum, so that the relative vertical positions of said virtual frame and said face on the one hand, and of said reference frame and said face on the other, correspond exactly.

Using the method to which the present invention relates, a simulation try-on of a virtual frame on the face of the patient in a virtual representation is advantageously performed by ensuring a repeatable accurate position of a reference frame physically fitted to the patient's face. The result of this simulation therefore reproduces as faithfully as possible, as regards the relative vertical positions of the virtual frame and the patient's face, the result which would have been obtained if the patient had physically worn the corresponding physical frame.

In one particularly advantageous embodiment, processing said second displayed image consists in drawing a horizontal line passing approximately through the center of the eyes of said face, projecting horizontally onto the plane of said second image a reference element of predefined length displayed at said scale, between two parts of said reference frame which fit over the nose of said face, which parts are separated by said predefined length, and measuring in the plane of said second image the distance between said horizontal line and said reference element of predefined length, said measured distance forming said datum.

Said horizontal line preferably passes through each of the previously detected corneal reflections of the eyes of the face.

Advantageously, said recorded virtual frame image is processed in such a way as to project horizontally onto the plane of said virtual frame image said reference element of predefined length to the corresponding location on said virtual frame where two opposing parts of said virtual frame designed to fit over the nose of said face are separated by said predefined length, the superimposition of said virtual frame image and said first image of said face being adjusted so that the distance between said corresponding horizontal line for said first image of said face and said reference element projected onto said virtual frame image corresponds to that provided by the datum.

Said reference element of predefined length is preferably adapted to model a longitudinal bridge whose length is chosen from 16 mm, 18 mm and 20 mm.

Advantageously, the recorded virtual frame images are classified on the basis of the length of said longitudinal bridge.

Advantageously, said reference frame worn on said face is provided with a calibration means which enables a reference scale to be established from said second image, for taking measurements.

Ophthalmic parameters of said face, necessary for the positioning of corresponding corrective lenses on said selected virtual frame, can be measured from said reference scale.

The invention also relates to a system for the selection of virtual eyeglass frames, comprising image capture means adapted to provide a first image of a face and a second image of said face wearing a reference frame; first processing means connected to said image capture means and adapted to format said provided images to a single scale; said first processing means being also adapted to determine, from said second formatted image, a datum for the vertical position of said reference frame on said face, said system comprising first storage means adapted to store said first formatted image and information about said face including at least said datum, second storage means adapted to store a plurality of virtual eyeglass frame images at said scale, and second processing means adapted to position virtually on said face a selected virtual frame, by superimposing the selected virtual frame image on said first image of said face using said datum, so that the relative vertical positions of said virtual frame and said face on the one hand, and of said reference frame and said face on the other, correspond exactly.

In one embodiment, said first processing means are adapted to define a horizontal line passing approximately through the center of the eyes of said face, projecting horizontally onto the plane of said second image a reference element of predefined length displayed at said scale between two parts of said reference frame fitting over the nose of said face and separated by said predefined length, and measuring in the plane of said second image the distance between said horizontal line and said horizontally projected reference element, said measured distance constituting said datum.

The system according to the invention preferably includes means for determining the corneal reflections of the two eyes of said face and said first processing means are then adapted to draw said horizontal line passing through each of said corneal reflections.

The plurality of virtual eyeglass frame images is preferably stored in said second storage means by projecting horizontally onto the plane of each stored virtual frame image said reference element of predefined length to the corresponding location of said virtual frame where two opposing parts of said virtual frame designed to fit over the nose of said face are separated by said predefined length, said second processing means being adapted to define a horizontal line on said first image of said face corresponding to the line defined by said first processing means, and superimposing said selected virtual frame image on said first image of said face so that the distance between said horizontal line defined on said first image of said face and said reference element projected onto said virtual frame image corresponds to the distance provided by said datum.

Advantageously, said reference frame worn on said face comprises a calibration means, said first processing means also being adapted to establish, from said second image of said face wearing said reference frame comprising said calibration means, a reference scale, and using said reference scale to measure ophthalmic parameters of said face which are required for positioning corresponding corrective lenses on said selected virtual frame, said first storage means also being adapted to store, as part of the information about said face, said measured ophthalmic parameters.

Said first and second storage means and said second processing means are preferably located externally in a server.

The system according to the invention may thus comprise a display terminal connected to said server via a communication network, said display terminal being adapted to display a representation of said face wearing said selected virtual frame.

The invention further relates to a device for determining the vertical position of an eyeglass frame worn by a face, characterized in that it comprises image capture means adapted to provide an image of said face wearing a reference frame, and processing means connected to said image capture means adapted to format said provided image at a predefined scale and determine, from said formatted image, a datum giving the vertical position of said reference frame on said face.

In one embodiment, said processing means are adapted to define a horizontal line passing approximately through the center of the eyes of said face, project horizontally onto the plane of said second image a reference element of predefined length which is displayed at said scale between two parts of said reference frame which fit over the nose of said face and are separated by said predefined length, and measure in the plane of said second image the distance between said horizontal line and said horizontally projected reference element, said measured distance constituting said datum.

BRIEF DESCRIPTION OF THE DRAWINGS

Other features and advantages of the invention will become apparent on reading the following description with one particular embodiment of the invention, given by way of indication, no limitation being implied, with reference to the appended drawings, in which.

DETAILED DESCRIPTION OF THE PREFERRED EMBODIMENT(S)

Figure 1:
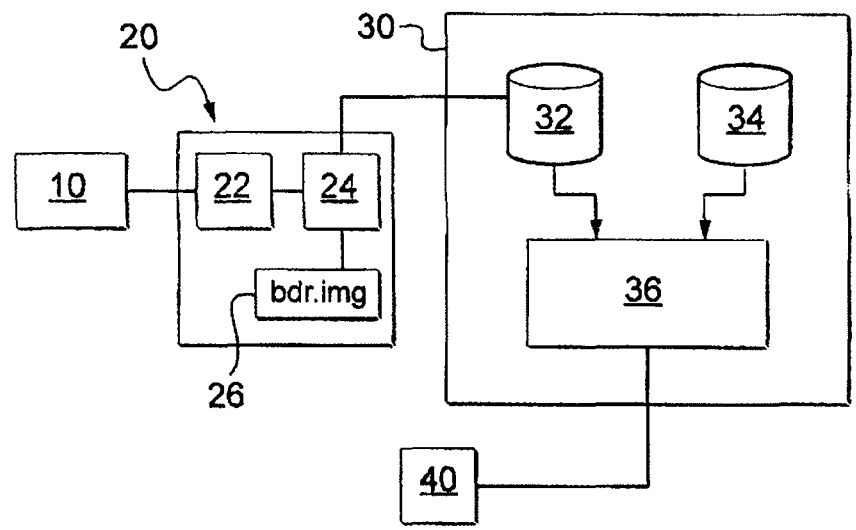
FIG. 1 is a block diagram illustrating a system according to the invention for selecting virtual frames.

FIG. 1 shows a system for the on-line selection of a virtual eyeglass frame. The system according to the invention comprises a first assembly designed particularly for determining a datum giving the vertical position of an eyeglass frame on a patient's face, to which the system may advantageously refer later in order to position a virtual frame correctly on the patient's face in a virtual representation, as will be explained in more detail later.

This first assembly comprises image capture means 10, comprising for example a CCD-type digital camera, connected to processing means 20. The processing means 20 are software means designed to be run for example in a microcomputer with a display interface (not shown) and an input interface (also not shown). These means are suitable for processing the digital images produced by the image capture means and are designed to carry out image conversion steps, particularly formatting the supplied images to one scale, as well as the computing part which among other things determines the aforementioned datum.

For this purpose, an initial image capture operation is required in order to calibrate the system, by giving it an image of the patient wearing a "reference" eyeglass frame, which may for example be the patient's own frame or eyeglasses tried on in the store, which in either case is assumed to be correctly fitted to his or her face.

This first operation of calibration, necessitating capture of the image of the patient's face wearing the reference frame, is preferably done at the premises of the provider of the on-line virtual frame selection service, which may for example be an optician's store.

Figure 2:
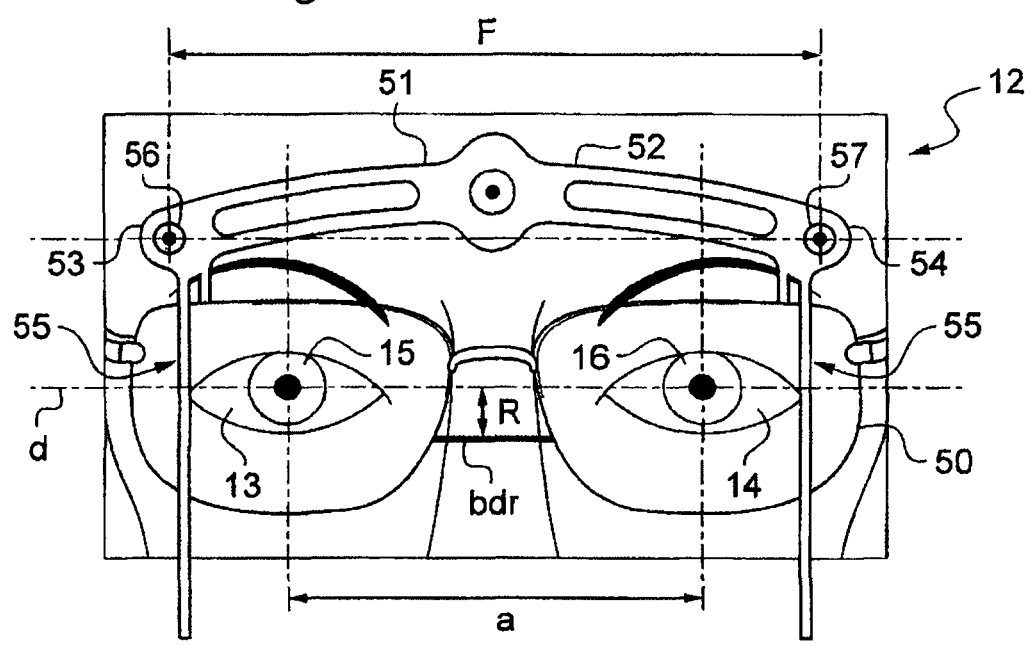
FIG. 2 is a partial schematic view of an image of a patient's face seen from the front wearing a reference frame for the purposes of the invention.

As illustrated in FIG. 2 showing one such image 12, the patient is seen wearing the reference frame 50, which is then adjusted correctly to his or her face. When the photograph is taken, the reference frame 50 advantageously has a calibration means 51 in the form of a central portion 52 extending longitudinally between two opposite ends 53, 54, which each comprise a fixing end enabling it to be clipped onto the frame. The calibration means 51, which is thus entirely mounted on the frame 50, has two opposite calibration markers 56, 57, one at each of the two opposite ends 53, 54, which can thus easily be identified in the image by the processing means. They may for example be white marks in the form of a disk with a black dot in the center. These two black dots of the calibration markers 56, 57 are also separated by a known distance F, for example exactly 110 mm.

This distance F between the calibration markers is a datum which the processing means 20 know and which allows the latter to determine a measurement scale and hence in particular to capture ophthalmic parameters from the patient by applying a conversion factor derived from the ratio of the number of pixels between the two black dots of the calibration markers to the known distance F. In this way the processing means will be able to convert the pixels counted at different processing stages into actual lengths, for example in millimeters.

The processing means 20 comprise recording means 22 for storing in digital form the aforementioned image of the patient's face wearing the reference frame 50 fitted with the calibration means 51, when the image is supplied by the image capture means 10, by reducing it relative to the original size, so that the scale is for example 1 mm to 1.5 pixels. The processing means 20 also include a calculating module 24 to carry out a certain number of calculations on the image thus captured.

In particular, these calculations are designed initially to determine certain of the patient's ophthalmic parameters which are necessary for the positioning of the corresponding corrective lenses on a frame selected at a later stage, and which include at least the interpupillary distance a.

For this purpose, FIG. 2 shows the pupils 15, 16 of the patient's eyes 13, 14, which pupils 15, 16 tend to have at their center a whitish mark corresponding to a reflection of natural or artificial light at the peak of the cornea, known as the corneal reflection. When the space containing the installation comprising the image capture means is dark, artificial lighting will advantageously be provided to emphasize this corneal reflection on the peak of the cornea. This corneal reflection is thus easily identifiable by the image process means and corresponds essentially to a point belonging to the straight line d corresponding to the optical axis of the eye.

Consequently, the calculating means 24 of the processing means 20 can, by converting into a number of pixels the distance between the two white dots on the image corresponding to the corneal reflections and adjusting it by the predefined measurement scale, calculate the distance a, which is the interpupillary distance.

Other ophthalmic parameters necessary for positioning corrective lenses of a frame will also be able to be calculated during this system calibrating phase—particularly the right and left pupil distances, which are the distances between the corneal reflection of the right eye, and that of the left eye, respectively, from the center of the reference frame.

The determination of these ophthalmic parameters by the processing means as described above is an operation known per se. Patent application FR 0112156 may usefully be referred to for more details.

Having thus been determined, these parameters, which are required to make the corrective lenses and position them correctly in their frame, are stored in first storage means 32 on a server 30, of web server type, which hosts the on-line virtual frame selection service.

Furthermore, according to the present invention, the calculating module of the processing means according to the invention is also suitable for determining a datum for the vertical position of the reference frame on the patient's face.

For this purpose, the image processing module 24 works with recording means 26 designed to record in digital form an image bdr.img of a reference element of predefined length denoted bdr in FIG. 2. This image is recorded at the same scale as the image 12 of the face of the patient wearing the reference frame. The reference element bdr is defined by a horizontal line whose length corresponds to a standard size of longitudinal bridge depending on different types of facial morphology, such as 18 mm, 20 mm or 22 mm, as a means of symbolizing the distance between the parts of the frame designed to sit astride the nose of a face based on the adopted facial morphology.

The image processing module is therefore adapted to transfer horizontally into the plane of the image 12 the reference element of predefined length bdr displayed at the same scale, between the two parts of the reference frame 50 sitting on the nose of the face. These parts are separated approximately by the predefined length, such as 18 mm. The processing module is also adapted to draw on the image 12 the line d passing through the optical centers of the two eyes, e.g. by identifying the corneal reflections as explained above, the line d thus being drawn through these corneal reflections. The calculating module then measures, in the plane of the image 12, for example by pixel counting, the distance R between the reference element of predefined length and this line d in a perpendicular direction, thus showing where on the face the bridge of the reference frame 50 rests. This position is therefore given as a relative value with respect to the corneal reflections. The distance R thus measured by the processing means is stored in the first storage means 32 of the server 30, along with the other information stored about this patient's face, including among other things the patient's ophthalmic parameters as explained above.

Measurement of this distance R is thus the vertical position datum for the reference frame 50 on the patient's face, and it will be used subsequently for the virtual positioning of the corresponding bridge of a selected virtual frame on the patient's face in a virtual representation at an appropriate location on the latter corresponding exactly to the location on the reference frame.

To this end, a virgin image of the face of the patient wearing no frame is also captured, for example when capturing the image 12 from which the system is calibrated. This image is recorded digitally by the recording means of the processing means at the same predefined scale, such as 1 mm to 1.5 pixels.

This image of the patient's face with no frame is also stored in the first storage means 32 of the server 30, to be used in the on-line virtual frame selection service.

For this purpose the server 30 also hosts a second database 34 designed to hold a digital library of images of virtual frames recorded at the same scale as that used to record the images of faces with the reference frame and without any frame. These images of virtual eyeglass frames could advantageously be classified by the size of their bridge, 18, 20 or 22 mm for example. They could also be classified by the shape of the face for which they are designed, to help the patient choose.

Now that the information about the patient's face, obtained in the system calibration phase—including the distance R in particular—and a virgin image of his or her face with no frame are stored in the system on the server 30, the patient can at any time use the on-line virtual frame selection service hosted on the server 30, allowing him or her to try on virtually on his or her face, in a virtual representation, a virtual frame selected from the digital library.

For this, the patient uses a display terminal 40 running for example a web browser allowing him or her to access the server 30 over the Internet.

The server 30 comprises processing means 36 capable of generating an image from the image of the patient's face, wearing no frame, stored in the first storage means 32 and from an image of a virtual frame stored in the second storage means 32 and selected by the patient by using the browser. To be more precise, this image, generated by the server's processing means 36 consists of an image of the virtual frame superimposed on the image of the face of the patient wearing no frame. This overlay of images is then served to the browser of the terminal 40 for display on the display screen, thus providing a virtual representation of the face of the patient wearing the virtual frame.

According to the invention, the processing means 36 of the server 30 are adapted to virtually position the selected virtual frame on the patient's face by superimposing the selected virtual frame image on the image of the face based on the distance R previously measured on this patient in the calibrating phase and stored in the first storage means 32 with the patient's information. As a result, the relative vertical positions of the selected virtual frame and the face, on the one hand, and of the reference frame and said face on the other, correspond exactly.

In order to bring this about, the images of virtual frames are recorded by projecting horizontally onto the plane of each virtual frame image the reference element of predefined length bdr to the corresponding location on each virtual frame where the two opposing parts of the virtual frame which fit over the nose of the face are separated by said predefined length, thus fictitiously defining, for each virtual frame, the location of the virtual longitudinal bridge of predefined size selected from 18, 20 and 22 mm for example.

In addition, the corneal reflections are also available in the image of the face with no frame, so that the processing means 36 are able to define in this image the line d passing through these corneal reflections, corresponding to the line d drawn on the image of the face of the patient wearing the reference frame.

The location on the face where the bridge of the virtual frame is to rest, defined fictitiously by the reference element of predefined length bdr projected onto the image of the virtual frame, is known from the datum R, previously stored, which gives this location as a value relative to the line d passing through the corneal reflections. The processing means 36 are thus able to adjust the superimposition of the image of the selected virtual frame and the image of the patient's face by counting the number of pixels, in a perpendicular direction, between the line d passing through the corneal reflections, drawn on the image of the patient's face, and the reference element of predefined length bdr projected onto the image of the selected virtual frame, in such a way that this number of pixels corresponds to that provided by the datum R.

Thus positioned relative to each other based on the datum R, said images form a virtual representation of the face of the patient wearing the selected virtual frame, allowing the virtual frame to be adjusted in simulation on the patient's face, as if he were physically trying it out.

This virtual representation can then be advantageously taken into consideration, along with the ophthalmic parameters captured in the calibration phase, to made corrective lenses and position them correctly in the selected frame, without the need for the patient to physically visit an optician's store to physically try out said frame.

The system and method of the invention thus make it possible advantageously to set up for the first time, on a website, a service for the remote selling of pairs of eyeglasses with corrective lenses. This service not only allows the user to select a frame but also to order this frame remotely with corresponding corrective lenses adapted to the patient. The lenses can be made and positioned correctly in the selected frame without any further visit from the patient to the optician's store, owing to the properties of virtual representation according to the invention of the selected frame worn on the face of the patient.

The invention claimed is:

1. Method for the on-line selection of a virtual eyeglass frame from among a plurality of virtual frames, said method comprising:
   generating an image giving a representation of a face wearing a selected virtual eyeglass frame, said image being constituted by superimposition of an image of said virtual eyeglass frame and a first image of a face without a frame recorded at the same scale as each other in order to be displayed simultaneously on a screen in such a way as to produce a representation of said face wearing the virtual eyeglass frame;
   recording a second image of said face wearing a reference frame at said scale;
   processing said second image displayed at said scale to determine a datum giving a vertical position of said reference frame on said face;
   adjusting the position of said image of said virtual frame relative to said first image of said face according to said datum determined from said second image of said face; and
   wherein processing said second displayed image comprises drawing a horizontal line passing approximately through a center of the eyes of said face, projecting horizontally onto a plane of said second image a reference element of predefined length displayed at said scale, between two parts of said reference frame which fit over a nose of said face, which parts are separated by said predefined length, and measuring in the plane of said second image a distance between said horizontal line and said reference element of predefined length, said measured distance forming said datum.

2. Method according to claim 1, further comprising detecting corneal reflections from both eyes of said face and said horizontal line passing through each of said corneal reflections.

3. Method according to claim 1, further comprising processing said recorded virtual frame image so as to project horizontally onto a plane of said virtual frame image said reference element of predefined length to a corresponding location on said virtual frame where two opposing parts of said virtual frame designed to fit over the nose of said face are separated by said predefined length, and adjusting the superimposition of said virtual frame image and said first image of said face so that the distance between said corresponding horizontal line for said first image of said face and said reference element projected onto said virtual frame image corresponds to that provided by the datum.

4. Method according to claim 1, further comprising adapting said reference element of predefined length to model a longitudinal bridge whose length is chosen from one of 16 mm, 18 mm and 20 mm.

5. Method according to claim 4, further comprising classifying the recorded virtual frame images on a basis of the length of said longitudinal bridge.

6. Method according to claim 1, further comprising providing said reference frame worn on said face with a calibration means which enables a reference scale to be established from said second image, for taking measurements.

7. Method according to claim 6, further comprising taking measurements from said reference scale of ophthalmic parameters of said face, said parameters being necessary for a positioning of corresponding corrective lenses on said selected virtual frame.

8. System for the selection of a virtual eyeglass frame, comprising: image capture means for providing a first image of a face and a second image of said face wearing a reference frame; first processing means connected to said image capture means for formatting said first and second images to a single scale; said first processing means being configured to determine, from said second formatted image, a datum for a vertical position of said reference frame on said face; first storage means for storing said first formatted image and information about said face including at least said datum; second storage means for storing a plurality of virtual eyeglass frame images at said scale; and second processing means for positioning a selected virtual eyeglass frame image virtually on said face, by superimposing the selected virtual eyeglass frame image on said first image of said face using said datum so that relative vertical positions of said selected virtual eyeglass frame image and said face and of said reference frame and said face correspond exactly.

9. System according to claim 8, wherein said first processing means are configured to define a horizontal line passing approximately through a center of the eyes of said face, projecting horizontally onto a plane of said second image a reference element of predefined length displayed at said scale between two parts of said reference frame fitting over a nose of said face and separated by said predefined length, and measuring in the plane of said second image the distance between said horizontal line and said horizontally projected reference element, said measured distance constituting said datum.

10. System according to claim 9, further comprising means for determining corneal reflections of the two eyes of said face and said first processing means being configured to draw said horizontal line passing through each of said corneal reflections.

11. System according to claim 9, wherein the plurality of virtual eyeglass frame images is stored in said second storage means by projecting horizontally onto a plane of each stored virtual frame image said reference element of predefined length to a corresponding location of said virtual frame where two opposing parts of said virtual frame designed to fit over the nose of said face are separated by said predefined length, said second processing means being configured to define a horizontal line on said first image of said face corresponding to a line defined by said first processing means, and superimposing said selected virtual frame image on said first image of said face so that a distance between said horizontal line defined on said first image of said face and said reference element projected onto said virtual frame image corresponds to a distance provided by said datum.

12. System according to claim 8, wherein said reference frame worn on said face comprises a calibration means, said first processing means being configured to establish, from said second image of said face wearing said reference frame comprising said calibration means, a reference scale, and using said reference scale to measure ophthalmic parameters of said face which are required for positioning corresponding corrective lenses on said selected virtual frame, and said first storage means being configured to store, as part of the information about said face, said measured ophthalmic parameters.

13. System according to claim 8, wherein said first and second storage means and said second processing means are located externally in a server.

14. System according to claim 13, wherein a display terminal is connected to said server via a communication network, and a said display terminal being configured to display a representation of said face wearing said selected virtual frame.

* * * * *